United States Patent Office 3,338,858
Patented Aug. 29, 1967

3,338,858
ADHESIVE COMPOSITION OF STYRENE, BUTA-
DIENE, UNSATURATED CARBOXYLIC ACID
COPOLYMER BLENDED WITH EPICHLORO-
HYDRIN-POLYAMIDE ADDUCT
Joseph P. Strasser, Midland, Mich., and Edwin R. Dunn, Fremont, Ohio, assignors to The Dow Chemical Company, Midland, Mich., a corporation of Delaware
No Drawing. Continuation of application Ser. No. 316,161, Oct. 14, 1963. This application Oct. 31, 1966, Ser. No. 591,027
10 Claims. (Cl. 260—29.7)

This application is a continuation of application Ser. No. 316,161 filed Oct. 14, 1963, and now abandoned.

This invention pertains to a binding agent useful in the manufacture of textiles. More particularly, it pertains to a latex composition which is especially advantageous in the manufacture of textile materials which require an adherent backing.

The application of latexes, natural and synthetic, to rug and carpet manufacture has grown concurrently with the development of tufted rugs and carpets starting about 1950. Latexes applied to the back of the rug or carpet proved to be a practical method of locking the tufts in place and strengthening such floor coverings. The manufacturing economies and quality of tufted rugs and carpets have resulted in the capturing of increasing proportions of the soft floor covering market. To provide an improved product there has been developed the procedure of applying a binding agent (generally comprising a latex) and a second backing such as burlap to the reverse side of a tufted rug or carpet with resulting greater strength and dimensional stability in the finished floor covering. The term "dimensional stability" as used by the art refers to the control of both stretch and shrinkage. This technique with tufted rugs and carpets proved sufficiently attractive that similar backing compositions were applied to woven rugs and carpets to up-grade their properties.

The usual backing material is burlap. However, other light-weight, usually loosely-woven cellulosic materials also are used and to a lesser extent non-woven materials such as felt. The term "scrim" whenever used in this specification refers to all of such materials and the term "scrim-adhesive" applies to the binding composition which causes the scrim to adhere to the back of a textile.

In spite of the great contributions made by adhesive compositions comprising synthetic latexes to the floor covering field, certain deficiencies became evident especially during manufacturing operations. For example, after the tufting step the latex with accompanying fillers is applied to the back of the carpet or rug and the scrim is placed in contact with the resulting adhering wet latex formulation, then the composite material is dried while such contact is maintained. In the drying ovens which are used commercially, considerable flexing, vibration, and different rates of stretch and shrink of the carpet and of the scrim occur, and this combination of stresses often causes the bond between the carpet and the scrim to be broken before the scrim-adhesive has dried. The typical synthetic latex formulation, especially when loaded with fillers as practiced commercially, lacks a sufficient degree of binding strength during the drying period and usually must be compounded with vulcanizing ingredients in order to obtain adequate properties after drying. While natural rubber latex when properly compounded does show a degree of wet strength which is acceptable, natural rubber latex requires vulcanization and does not possess the combination of advantages of synthetic latexes, e.g., uniformity of properties from lot-to-lot, stability of supply and a relatively steady, predictable price. Thus, it would be desirable to have a composition which develops early wet strength, and which does not require expensive and complicated formulation to provide the necessary degree of binding power in the completed scrim-backed rug or carpet.

It is, therefore, an object of this invention to provide a binding composition for use in the manufacture of textiles. It is a further object to provide a latex composition which is useful in binding textile fabrics. It is a more specific object to provide a latex composition which is useful in the manufacture of rugs and carpets. It is an even more specific object to provide a latex composition which has early wet strength to bind a backing to a textile material. A still more specific object is to provide a latex composition which is a scrim adhesive having early wet strength and which when dried results in greater tuft lock and improved dimensional stability in a tufted floor covering.

These and other objects are obtained in a blend comprising (I) an aqueous dispersion of a substantially water-insoluble polymer, i.e., a latex, wherein the polymer has a multiplicity of carboxyl groups, and (II) an aqueous solution of a strongly cationic resin of a moderate molecular weight (i.e., about 2000 to about 5000), especially the reaction product of epichlorohydrin with a linear polyamide derived from a saturated aliphatic dicarboxylic acid and a polyalkylene polyamine.

That latex that is used with a epichlorohydrin-polyamide adduct as hereinafter defined is characterized as being film-forming below about 100° C. and contains as an essential ingredient from about 0.5 percent to about 10 percent, preferably from about 1.5 percent to about 3.5 percent, by weight of carboxyl group, based on the total weight of the polymer in the latex. Latexes containing larger proportions of carboxyl group such as up to about 30 percent, may be prepared and used but such materials require higher amounts of the polyamide-epichlorohydrin adduct to achieve the requisite water resistance and undesirable stiffness may result. Thus, ordinarily such compositions are not preferred.

To prepare the latex applicable to the practice of the invention at least two polymerizable, ethylenically unsaturated monomers, of the class of styrene and monomers copolymerizable with styrene, are copolymerized in an emulsion system to form a latex copolymer which is film-forming below 100° C. or which can be made film-forming at that temperature by the addition of solvents or plasticizers. At least one of the monomers polymerized to form a latex for use in the instant invention consists of those polymerizable, ethylenically unsaturated monomers which have pendant carboxyl groups or which have substituent groups which after polymerization can be converted to carboxyl groups. Mixtures of a monocarboxylic acid and a dicarboxylic acid, each having $\alpha,\beta$-ethylenic unsaturation often are used. Sometimes as many as 3 or more different $\alpha,\beta$-ethylenically unsaturated carboxylic acids are combined in the recipe. Examples of such ethylenically unsaturated monomers having pendant carboxyl groups are acrylic acid, methacrylic acid, itaconic acid, fumaric acid, maleic acid, ethyl acid maleate, butyl acid maleate, salts of such acids, and mixtures thereof.

Among the ethylenically unsaturated monomers of the class of styrene and monomers copolymerizable with styrene are the monomers having carboxyl groups described supra, the alkenyl-aromatic compounds (the styrene compounds), the derivatives of ethylenically unsaturated acids such as the acrylic esters, acrylic nitriles, maleic esters, fumaric esters, unsaturated alcohol esters, unsaturated ketones, the conjugated olefins and other compounds containing one or more ethylenic linkages capable of addition polymerization.

Specific examples of such ethylenically unsaturated compounds are styrene, $\alpha$-methlystyrene, ar-methyl-styrene, ar-ethylstyrene, $\alpha$-ar-dimethylstyrene, ar,ar-dimethylstyrene, ar-t-butyl styrene, vinylnaphthalene, methoxystyrene, cyanostyrene, acetylstyrene, monochlorostyrene, dichlorostyrene and other halostyrenes, methyl methacrylate, ethyl acrylate, butyl acrylate, hexyl acrylate, 2-ethylhexyl acrylate, lauryl methacrylate, phenyl acrylate, acrylonitrile, methacrylonitrile, ethyl α-chloroacrylate, diethyl maleate, polyglycol maleate, vinyl chloride, vinyl bromide, vinylidene chloride, vinylidene bromide, vinyl methyl ketone, methyl isopropenyl ketone, vinyl ethyl ether, 1,3-butadiene, isoprene and the like.

At least one of such ethylenically unsaturated monomers not containing a carboxyl group is required and as many as 4 or more may be used.

The optimum amount of the monomers, having carboxyl groups, which are copolymerized in the latex will vary somewhat according to the properties desired for the particular end use. The lower amounts, in general, will be used where the pendant reactive carboxyl groups of the latex polymer are in relatively greater concentration on the surface of the particles rather than homogeneously scatered throughout the particles and where a minimum amount of cross-linking is desired.

The above-described monomers are copolymerized in aqueous emulsion containing surface active agents, catalysts, modifiers, etc., and under conditions of time, temperature, pressure, agitation, etc., in accordance with well known principles of emulsion polymerization. However, because of the effects provided by the carboxyl-containing monomers, the kinds of constituents employed in the aqueous phase of the emulsion polymerization are selected to be compatible with such monomers. For example, only anionic or nonionic emulsifiers ordinarily are used. Moreover, since the carboxylic substituents (particularly in the salt form) confer surface active properties to the monomer and to the resulting copolymer in the latex, the amount of conventional surface active agent can often be markedly reduced or even eliminated in the emulsion polymerization step. The latexes may be prepared by copolymerization of monomers selected as heretofore described or there may be substituted for such latexes water dispersions of preformed polymers which have been modified; e.g., by grafting or by other means to have pendant carboxyl groups; or polymers which are hydrolyzable to give water dispersions of polymers having such carboxyl groups. The water dispersions of polymers advantageously contain from about 40 percent to about 55 percent solids although concentrations outside these limits may be used. Such water dispersions usually have a pH of from 8 to 10 or are treated with usual acidifying or alkalizing agents to change the pH to within that range.

The water-soluble cationic resin which is blended with the latex to comprise the composition of this invention is the adduct of epichlorohydrin and a polyamide having recurring groups of the formula

wherein each of $n$ and $y$ individually is an integer preferably from 2 to 4, although $y$ may be as large as about 8 and R is a divalent non-aromatic organic radical having from 1 to 8, preferably from 2 to 6, carbon atoms; i.e., a residue from a saturated dicarboxylic acid.

Such adducts may be obtained by the method of U.S. Letters Patent 2,926,154. Saturated dibasic acids such as diglycolic acid, malonic acid, succinic acid, glutaric acid, adipic acid, pimelic acid and suberic acid or mixtures therof are caused to react with polyalkylene polyamines such as diethylenetriamine, triethylenetetramie, tetraethylenepentamine, dipropylenetriamine and mixtures thereof, by mixing and heating to from about 110° C. to about 250° C., preferably from about 160° C. to about 210° C., at about atmospheric pressure until the reaction is substantially complete, usually within less than about three hours. The polyamide obtained thereby is then mixed with epichlorohydrin and the reaction facilitated by heating and maintaining the temperature at about from 45° C. to about 100° C., preferably from about 45° C. to about 70° C., until the desired viscosity is reached—often equivalent to or greater than C on the Gardner-Holdt scale for a 20 percent solids solution, but for an insufficient time to cause water-insolubility. The product is stabilized by the addition of an acid, such as a mineral acid, to reduce the pH to about 5 or below. The proportion of the reactants usually is from about 0.8 to about 1.4 moles of polyalkylene polyamine per mole of dicarboxylic acid and for each secondary amine group in the resulting polyamide there is reacted therewith from about 0.5 mole to 1.8 moles, preferably from about 0.9 mole to about 1.5 moles, of epichlorohydrin. Usually, the water-soluble cationic resin is diluted with water to about 10 percent solids concentration for use in carrying out this invention but higher or lower concentrations may be used if desired.

The scrim adhesive of this invention comprises a blend of a latex and a cationic water-soluble resin each as heretofore described. To achieve maximum economy it is common and usual practice to use fillers and thickeners in adhesive compositions for applying scrim to rugs and carpets. Such ingredients are also used with the scrim adhesive of this invention. However, the vulcanizing ingredients which ordinarily are required for the prior art adhesives which contain latexes are unnecessary. The fillers usually comprise calcium carbonate but mineral pigments such as ochre, titanium dioxide, mica, magnesium silicate, lead chromate, sulfates, arsenates, and lead carbonate may be used if desired. Usually the filler is used in the proportion of from about 50 parts to about 200 parts per 100 parts of copolymer in the latex component of the adhesive composition. A commonly used range is from 100 parts to 150 parts of filler per 100 parts of the copolymer. If desired a portion of the synthetic latex can be replaced by natural rubber latex.

In preparing the scrim adhesive of this invention the filler, usually as a slurry or aqueous dispersion of from about 60 percent to about 80 percent solids but optionally dry, is blended with the latex component and the water-soluble cationic resin solution. The remaining ingredients such as thickeners and/or water to obtain a desired viscosity depending upon the method of application of the adhesive (as described below) are mixed thoroughly therewith. Thus, the combination of this invention, consisting essentially of the carboxyl-containing-polymer from the latex and the water-soluble cationic resin, is obtained; and combined therewith are the fillers and diluents commonly used in the art.

Calculated on a dry basis, the essential ingredients are used in the proportion of from about 0.3 part to about 5.0 parts of the water-soluble cationic resin for each 100 parts of polymer in the latex.

The adhesive formulation is applied to the back of textile fabrics such as carpets or rugs by means of a roll coater, a knife coater or a spray coater. The rugs and carpets thus coated may be any of several types such as woven, flocked, previously backsized tufted, or untreated tufted. The scrim is then brought into intimate contact with the wet adhesive and the composite material is then passed through an oven for drying, usually at a temperature of from about 200° to about 350° F. The improved adhesive of the instant invention causes the scrim to adhere continuously, uniformly and securely to the back of the carpet or rug during the drying operation. Concurrently with the removal of water and other volatile materials in the oven, the heating which speeds such removal of volatile materials also speeds the interaction of the carboxyl group of the polymer provided by the latex with the reactive groups of the cationic water-soluble resin so that the scrim is fastened continuously and securely to the carpet or rug; in a tufted carpet or rug the tufts are more securely locked; and the laminate obtained thereby is stronger and has greater dimensional stability, yet remains sufficiently flexible to withstand subsequent handling such as during forming into rolls for shipment, during installation at the place of subsequent use, or during cleaning operations. These advantages have been obtained without resorting to complicated and expensive vulcanizing formulations.

In order to more clearly convey to those skilled in the art the practice of the instant invention the following examples are given without intending any limitation thereby. Unless otherwise noted all parts and percentages are by weight.

*Example 1*

Dry calcium carbonate (100 parts) was mixed with 197 parts of a latex (hereinafter called Latex A) comprising 50.8 percent of a copolymer consisting of 53.1 per cent of styrene, 43.0 percent of 1,3-butadiene, 1.04 percent of acrylic acid and 2.86 percent of fumaric acid. With 200 parts of the resulting blend (135 parts of solids) was mixed 2.5 parts of "Kymene" 557, a brand of an aqueous solution containing about 10 percent solids of a polyamide-epichlorohydrin adduct having 12.8 percent of nitrogen, a pH in the range 4.5 to 5.2, a specific gravity (25/15.6° C.) of 1.028, and a viscosity at 25° C. in the range of 40–65 centipoises. To the resulting mixture was added 1.4 parts of an aqueous solution containing 12.5 percent of a polyacrylic acid thickener. The composition thus prepared was an advantageous scrim adhesive which showed excellent early wet strength when coated at the rate of 20 ounces (calculated on a dry basis) per square yard of tufted carpet and burlap scrim was applied thereto. After drying at 300° F. in an oven for 12 minutes the backed carpet had excellent strength and dimensional stability.

*Example 2*

A scrim adhesive composition was prepared as in Example 1 except the latex, hereinafter called Latex B, comprised 50 percent of a copolymer consisting of 39 percent of styrene, 58.6 percent of 1,3-butadiene, 1.2 percent of acrylic acid and 1.2 percent of a mixture of α,β-ethylenically unsaturated dicarboxylic acids consisting predominantly of fumaric acid.

Excellent early wet strength and excellent strength and dimensional stability of the dried carpet similar to that shown by Example 1 were obtained.

*Example 3*

A scrim adhesive composition was prepared as in Examples 1 and 2 except the latex, hereinafter called Latex C, comprised a copolymer consisting of 54.2 percent of styrene, 43.7 percent of 1,3-butadiene, 1.85 percent of acrylic acid and 0.25 percent of fumaric acid. Excellent early wet strength similar to that provided by Examples 1 and 2 aided in the preparation of a dried scrim-backed carpet having excellent tuft lock and dimensional stability.

*Example 4*

Other scrim adhesive compositions were prepared by the procedure of Examples 1–3 with differing amounts of water-soluble cationic resin and with Latexes A, B and C as such latexes are defined in the previous examples. For comparison with the above examples of this invention, other adhesive compositions, not examples of the invention, were prepared in the same manner from the same latexes but having no water-soluble cationic resin blended therewith. The adhesive compositions were coated at the rate of 20 ounces, calculated on a dry basis, per square yard of tufted carpet, then burlap scrim was applied thereto. The resulting laminates were dried at various time intervals in an oven at 300° F., then removed from the drying oven and trimmed to 2-inch square samples. In a test of the early wet strength, a clamp was attached to the top row of tufts and the sample hung vertically from a support and a variable weight was attached by means of a wire fastened to the bottom edge of the scrim. The weights were increased until separation of the carpet and the scrim occurred. The weight, in grams, required to separate the scrim from the carpet was recorded as the wet strength. The results are shown in Table I.

TABLE I

| Latex | Resin [1] | Wet Strength, grams/2 in.,[2] Samples dried at 300° F. for— | | | |
|---|---|---|---|---|---|
| | | 3 min. | 4 min. | 5 min. | 6 min. |
| Latex A | [2] 0 | 150 | 150 | 440 | 1,140 |
| Do | .5 | 355 | 355 | 800 | 1,720 |
| Do | 1.0 | 400 | 400 | 770 | 1,520 |
| Do | 1.25 | 320 | 320 | 1,010 | 1,520 |
| Latex B | [2] 0 | 260 | 260 | 260 | 400 |
| Do | .5 | 210 | 240 | 560 | 570 |
| Do | 1.0 | 300 | 330 | 600 | 930 |
| Latex C | [2] 0 | 90 | 460 | 960 | >1,500 |
| Do | .5 | 780 | 1,300 | >1,500 | |

[1] Resin as described in Example 1, in parts per 100 parts of Latex Solids.
[2] Not examples of this invention.

*Example 5*

A scrim adhesive composition is prepared from (a) a latex comprising a carboxylated polymer, (b) a water-soluble cationic resin and (c) a filler in the following manner: With 143 parts of a slurry of 100 parts of calcium carbonate (the filler) is mixed 10 parts of a 10 percent solution of water-soluble cationic resin, having a molecular weight in the range from about 2000 to about 5000 and a viscosity from about 40 to about 65 centipoises at 25° C., which consists of the adduct of epichlorohydrin and a polyamide derived from about equimolar proportions of adipic acid and diethylenetriamine wherein the adduct has about 1.1 moles of epichlorohydrin for each mole of secondary amino group, i.e.,

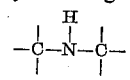

in the polyamide. To the mixture obtained thereby is added 100 parts, dry basis, of a latex at about 50 percent solids concentration comprising a polymer of 48 percent by weight of styrene, 48 percent by weight of 1,3-butadiene, and 4 percent by weight of acrylic acid.

The resulting mixture is thickened with 2 parts of an aqueous solution containing 12.5 percent of sodium polyacrylate. The composition obtained thereby is a scrim adhesive composition which has early wet strength when coated at the rate of 20 ounces (calculated on a dry basis) per square yard of tufted carpet and burlap scrim is applied thereto.

After drying in an oven of 300° F. for 12 minutes the backed carpet has excellent strength and dimensional stability.

Similarly advantageous results are obtained when there are substituted for the water-soluble cationic resin of the above examples, other epichlorohydrin-polyamide adducts in which the polyamide was derived from other saturated dicarboxylic acids such as diglycolic acid, malonic acid, succinic acid, pimelic acid, suberic acid and mixtures thereof; and from other polyalkylene polyamines, e.g., triethylenetetramine, tetraethylenepentamine, dipropylenetriamine, and mixtures thereof.

Likewise, similarly advantageous results are obtained when there are substituted for the latexes in the above examples of this invention other carboxyl-containing latexes such as latexes comprising copolymers of:

(a) Styrene, 1,3-butadiene and acrylic acid,
(b) Ethyl acrylate, n-butyl acrylate and acrylic acid,
(c) Styrene, 1,3-butadiene, acrylic acid and methacrylic acid,
(d) Ethyl acrylate, methyl methacrylate and acrylic acid,
(e) Styrene, n-butyl acrylate, acrylonitrile and acrylic acid,
(f) Other latexes which are film-forming below about 100° C. and which comprise polymers containing carboxyl groups in which the carboxyl-containing component of the copolymer is present in an amount from about 0.5 to about 10 percent by weight based on the total copolymer weight.

A comparison of any of the wet strength results as shown in Table I for scrim adhesives prepared from Latexes A, B, or C but not containing a water-soluble cationic resin (i.e., not containing the full combination and thus not examples of this invention) with wet strength results from scrim adhesives prepared from the corresponding latexes in accordance with this invention illustrates the significantly greater strength achieved within shorter time intervals by the products of the new combination.

That which is claimed is:

1. A latex adhesive composition comprising a blend of (A) a latex comprising a substantially water-insoluble, film-forming copolymer of an alkenyl aromatic compound selected from the group consisting of styrene, α-methylstyrene, ar-methylstyrene, ar-ethylstyrene, α-ar-dimethylstyrene, ar,ar-dimethylstyrene, ar-t-butyl styrene, vinylnaphthalene, methoxystyrene, cyanostyrene, acetylstyrene, and the halostyrenes, a conjugated diolefin and from about 0.5 percent to about 10 percent by weight of a polymerizable, ethylenically unsaturated, carboxyl-containing monomer; and (B) an adduct of epichlorohydrin and a polyamide, said polyamide having recurring groups of the formula

—NH—$(C_nH_{2n}HN)_y$—CORCO— wherein $n$ is an integer from 2 to 4; $y$ is an integer from 2 to 8 and R is a divalent non-aromatic organic radical having from 1 to 8 carbon atoms.

2. The latex adhesive composition of claim 1 in which the blend consists essentially of
   (A) the latex at from about 40 to about 55 percent by weight of polymer solids
   (B) a dilute solution of from about 0.3 part to about 5 parts by weight of the adduct of epichlorohydrin and a polyamide and
   (C) from about 50 parts to about 200 parts by weight of a mineral filler as an aqueous slurry at from about 60 to about 80 percent solids by weight; the parts of (B) and (C) being on the basis of 100 parts by weight of the polymer in the latex.

3. The latex adhesive composition of claim 1 in which the conjugated diolefin is 1,3-butadiene.

4. The latex adhesive composition of claim 1 in which the latex comprises a copolymer of styrene, 1,3-butadiene, acrylic acid and fumaric acid.

5. The latex adhesive composition of claim 3 in which the styrene compound is styrene.

6. The latex adhesive composition of claim 3 in which the carboxyl-containing monomer comprises acrylic acid.

7. The latex adhesive composition of claim 3 in which the carboxyl-containing monomer is a mixture of a monocarboxylic acid and a dicarboxylic acid.

8. A scrim-backed textile article comprising
   (A) a textile fabric
   (B) a scrim
   (C) an interaction product of
      (1) a copolymer of an alkenyl aromatic compound selected from the group consisting of styrene, α-methylstyrene, ar-methylstyrene, ar-ethylstyrene, α-ar-dimethylstyrene, ar,ar-dimethylstyrene, ar-t-butyl styrene, vinylnaphthalene, methoxystyrene, cyanostyrene, acetylstyrene, and the halostyrene, a conjugated diolefin and from about 0.5 percent to about 10 percent by weight of a polymerizable, ethylenically unsaturated, carboxyl-containing monomer; and
      (2) an adduct of epichlorohydrin and a polyamide, said polyamide having recurring groups of the formula

—NH—$(C_nH_{2n}HN)_y$—CORCO— wherein $n$ is an integer from 2 to 4, $y$ is an integer from 2 to 8 and R is a divalent non-aromatic organic radical having from 1 to 8 carbon atoms; said scrim being continuously and securely bound to the textile fabric by said interaction product.

9. The article of claim 8 in which the textile fabric is a floor-covering material.

10. The article of claim 8 in which the textile fabric is a tufted carpet.

References Cited

UNITED STATES PATENTS 2,724,707  11/1955  Brown _____ 260—80.7
3,049,469  8/1962  Davidson _____ 162—164

MURRAY TILLMAN, *Primary Examiner.*

W. J. BRIGGS, Sr., *Assistant Examiner.*